(12) United States Patent
Gibson, Sr.

(10) Patent No.: US 7,400,716 B1
(45) Date of Patent: Jul. 15, 2008

(54) MULTIFUNCTIONAL INTERCOM SYSTEM WITH MESSAGE RECORDING/RETRIEVAL FUNCTIONS

(76) Inventor: Aaron Gibson, Sr., 18507 River Rd., Hazel Crest, IL (US) 60429

( * ) Notice: Subject to any disclaimer, the term of this patent is extended or adjusted under 35 U.S.C. 154(b) by 917 days.

(21) Appl. No.: 10/888,672

(22) Filed: Jul. 9, 2004

(51) Int. Cl.
*H04M 1/60* (2006.01)
*H04M 9/00* (2006.01)

(52) U.S. Cl. ............ 379/167.01; 379/167.02; 379/167.05; 379/167.07; 379/167.12

(58) Field of Classification Search ........ 379/67.1, 379/68, 88.12, 88.18, 88.23, 167.01–167.02, 379/167.05, 167.07, 167.12, 167.15
See application file for complete search history.

(56) References Cited

U.S. PATENT DOCUMENTS 6,721,408 B1 * 4/2004 Bain et al. ............. 379/159

| | | | |
|---|---|---|---|
| 7,079,014 B2 * | 7/2006 | Steinetz et al. | 340/392.1 |
| 2003/0206101 A1 * | 11/2003 | Dixon et al. | 340/539.1 |
| 2006/0038663 A1 * | 2/2006 | Steinetz et al. | 340/392.1 |

* cited by examiner

*Primary Examiner*—Binh K. Tieu
(74) *Attorney, Agent, or Firm*—Goldstein Law Offices PC

(57) ABSTRACT

A multifunctional intercom system having message recording/retrieval functions, a remote control unit, and music playing capabilities, wherein the various buttons are labeled in Braille for use by hearing impaired individuals. The intercom system comprises a main control panel, a front door intercom/message unit, a plurality of room intercom units, and a remote control unit, each capable of transmitting and receiving sound from one another. The main control panel has a CD player and a clock radio, and is capable of selectively broadcasting music to the front door intercom/message unit and to the plurality of room intercom units. Messages left at the front door intercom/message unit may be retrieved at the main control panel, or by calling the intercom system from an outside phone line. In use, the user programs a private security code into the intercom system. Unauthorized individuals without knowledge of the private security code are unable to access the messages left upon the message recorder.

17 Claims, 3 Drawing Sheets

MULTIFUNCTIONAL INTERCOM SYSTEM WITH MESSAGE RECORDING/RETRIEVAL FUNCTIONS

BACKGROUND OF THE INVENTION

1. Field of the Invention

The invention generally relates to an intercom system, and in particular it relates to a multifunctional intercom system having message recording/retrieval functions, a remote control unit, and music playing capabilities.

2. Description of the Related Art

Many different types of intercom systems are available for transmitting sound from one part of a building, aircraft, or ship to another. Most common intercoms are installed near the entrance of a residence and merely allow a visitor to verbally communicate with a resident of a home or an apartment, in order to identify him/herself, and thereby allows the resident to ascertain the identity of the visitor prior to unlocking the front door, usually by pressing a button located within the home of the resident. Most such systems are not capable of playing music or of recording messages left by the visitor and are not easily accessible to visually impaired individuals. Accordingly, there is a need for a multifunctional intercom system having message recording/retrieval functions and music playing capabilities, wherein the various buttons are labeled in Braille in order that the intercom system may be readily used by visually impaired individuals.

A variety of communications systems are available for allowing a visitor to remotely communicate with a homeowner. For example, U.S. Pat. No. 5,570,083 to Johnson appears to show a doorbell with a speech and playback assembly for allowing a visitor to leave a message when the occupant is absent. Additionally, U.S. Pat. No. 5,210,520 to Housely appears to show a programmable doorbell with an LCD capable of displaying a message. Furthermore, U.S. Pat. No. 4,715,060 to Lipscher appears to show a message system capable of connecting a doorbell speaker to a telephone answering machine.

While these devices may be suitable for the particular purpose employed, or for general use, they would not be as suitable for the purposes of the present invention as disclosed hereafter.

SUMMARY OF THE INVENTION

It is an object of the invention to produce an intercom system which allows a visitor to the home of a resident to leave a message if the resident is not at home. Accordingly, the intercom system has a main control panel having a message recorder, and a front door intercom/message unit in communication with the message recorder, thereby allowing the visitor to the home of the resident to leave a message if the resident is not at home.

It is another object of the invention to produce an intercom system which is accessible from various locations within the home, in addition to being accessible from the main control panel. Accordingly, the intercom system has a plurality of room intercom units for placement in various rooms within the home, thereby providing an intercom system which is accessible from various locations within the home, in addition to being accessible from the main control panel.

It is yet another object of the invention to produce an intercom system which is capable of broadcasting music. Accordingly, the main control panel has a CD player and a radio and is capable of broadcasting music to the front door intercom/message unit and to the various room intercom units.

It is a further object of the invention to produce an intercom system having functions which may be remotely controlled from a location other than the main control panel. Accordingly, the intercom system has a remote control unit which allows the user to access the main control panel from a location other than the main control panel.

It is an additional object of the invention to produce an intercom system which is readily accessible to the visually impaired. Accordingly, the buttons on each of the components of the intercom system are labeled in Braille, thereby rendering the intercom system readily accessible to the visually impaired.

It is yet another object of the invention to produce an intercom system which may not be accessed by an unauthorized individual. Accordingly, the user programs a private security code into the intercom system, and an individual without knowledge of the code is unable to access the various functions of the intercom system.

The invention is a multifunctional intercom system having message recording/retrieval functions, a remote control unit, and music playing capabilities, wherein the various buttons are labeled in Braille for use by hearing impaired individuals. The intercom system comprises a main control panel, a front door intercom/message unit, a plurality of room intercom units, and a remote control unit, each capable of transmitting and receiving sound from one another. The main control panel has a CD player and a clock radio, and is capable of selectively broadcasting music to the front door intercom/message unit and to the plurality of room intercom units. Messages left at the front door intercom/message unit may be retrieved at the main control panel, or by calling the intercom system from an outside phone line. In use, the user programs a private security code into the intercom system. Unauthorized individuals without knowledge of the private security code are unable to access the messages left upon the message recorder.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
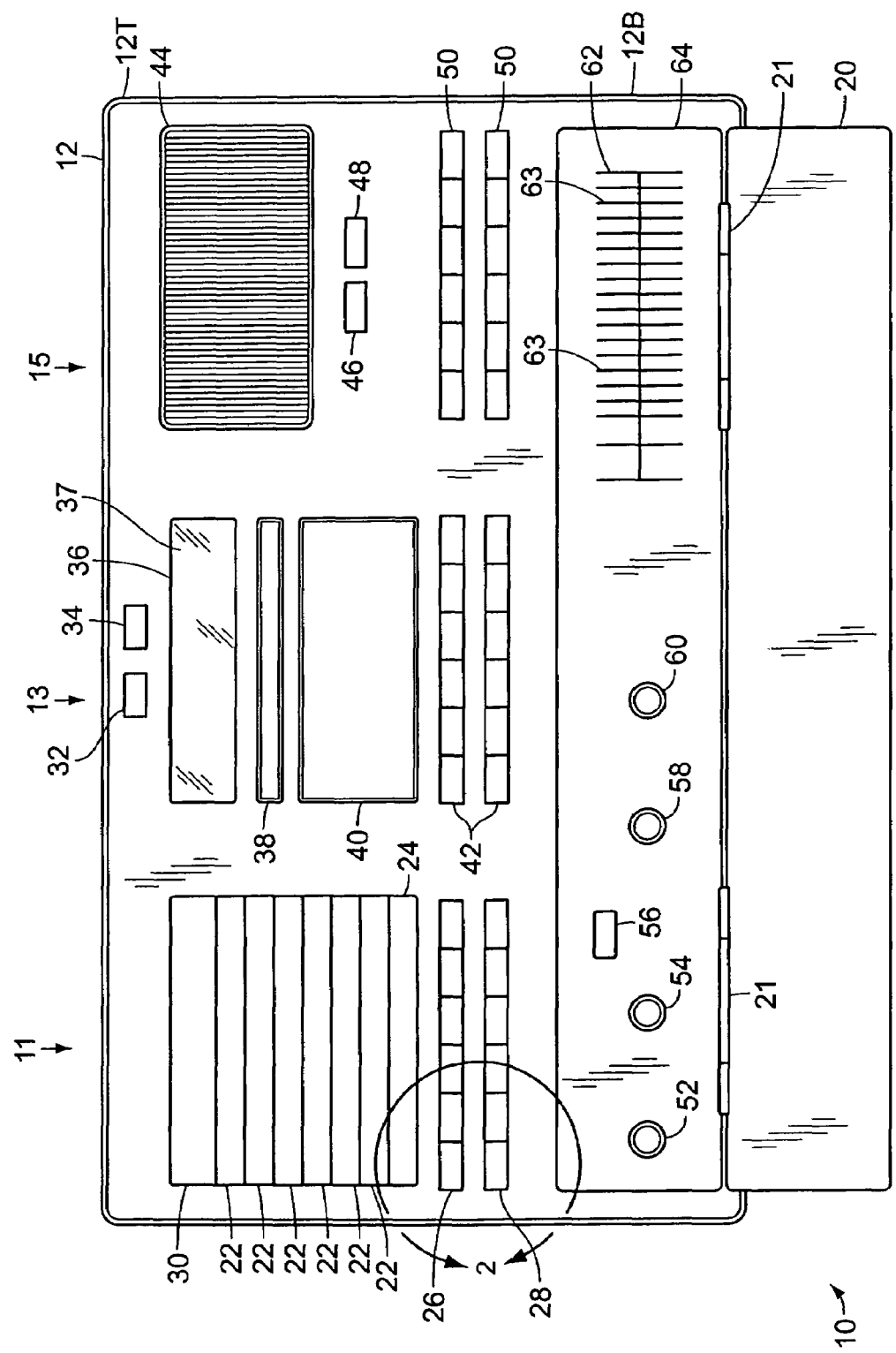
FIG. 1 is a front elevational view of a main control panel of an intercom system according to the present invention.

The intercom system 10 comprises a main control panel 12, a front door intercom/message unit 16, a plurality of room intercom units 18, and a remote control unit 14. Each of these components of the intercom system 10 will be described in turn. The main control panel 12, the front door intercom/message unit 16, the room intercom units 18, and the remote control unit 14 are each capable of transmitting and receiving sound.

FIG. 1 illustrates the main control panel 12 of the intercom system 10. The main control panel 12 has a top 12T, a bottom 12B, a leftmost section 11, a middlemost section 13, and a rightmost section 15. Each of the sections 11, 13, and 15 are described in turn.

Figure 2:
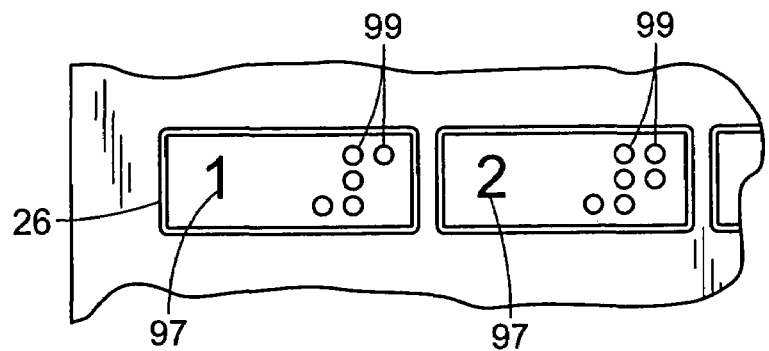
FIG. 2 is an enlarged front elevational view taken generally in the area of circle 2 in FIG. 1, illustrating the CD selection buttons and the mode function buttons, having raised Braille indicia thereon.

The leftmost section 11 contains a CD player 30 for playing compact discs, and six CD compartments 22, each of which selectively holds a compact disc. The CD compartments 22 are numerically and sequentially labeled. The CD player 30 is in communication with each of the CDs within the CD compartments 22. The CD player 30 has a song selector bar 24 which, when selectively activated, randomly chooses a series of songs from the six CDs within the CD compartments 22 for play. The leftmost section 11 also has six CD selection buttons 26 and six CD player control buttons 28. Each of the numerically labeled CD selection buttons 26 corresponds to one of the CD compartments 22 and allows a user to play one of the CDs in one of the compartments 22 by pressing down on the corresponding CD selection button 26. FIG. 2 illustrates an enlarged view of the CD selection buttons 26. Each of the buttons 26 is numerically labeled with indicia 97 corresponding to one of the six numbered CD compartments 22. Additionally, each of the buttons 26 is labeled with Braille markings 99, so that a visually impaired user can differentiate between the various buttons 26.

The CD player control buttons 28 allow the user to open and close the CD compartments 22 and to choose the desired mode for the CD player 30. In particular, the CD player buttons 28 are labeled with the words "open", "close", "stop", "repeat", "play", and "skip". Pressing down upon the "open" button or "close" button causes one of the CD compartments 22 to open or close, respectively, in order that the user may insert or remove the CDs from the CD compartments 22. Pressing down on the other of the aforementioned CD player buttons 28 causes the CD player to stop playing, to repeat the playing of the previous song, to play the next song, or to skip a song, respectively. Each of the CD player buttons 28 is additionally labeled in Braille, so that a visually impaired individual will be able to differentiate between the CD player buttons 28.

The middlemost section 13 has an AM/FM clock radio 36, and a message recorder 38 located below the clock radio 36. The message recorder 38 records incoming messages left by a visitor at the front door intercom/message unit 16. Additionally, the message recorder 38 has an associated message screen 40, for displaying the messages recorded upon the message recorder 38, in order that a hearing impaired individual may read the messages. This may be accomplished, for example, by including a computer within the main control panel 12 having application programs capable of displaying printed words through voice recognition of common speech patterns present within incoming sound waves produced when an individual speaks into the recorder 38. The message recorder 38 is connected to a phone line so that the user can "call" the message recorder 38 from an outside line, and hear the messages which have been recorded thereon. The message recorder 38 has two rows of associated message recorder operation buttons 42, including a power button for selectively powering the message recorder 38, and a plurality of buttons for controlling message volume level, rewinding, fast-forwarding, and playing the messages, navigating the frequencies of the AM/FM radio, and for setting the time on the clock radio 36.

The clock radio 36 has an AM/FM radio, an alarm clock, and a light emitting diode (LED) display window 37 for displaying the time and the frequency numbers of the radio station that is playing. The display window 37 also has indicator lights for informing the user whether the AM or FM band is currently playing on the radio, whether the CD player 30 is being played, and also displays the alarm settings.

The top 12T of the middlemost section 13 of the control panel 12 has a message indicator light 32 for providing a visual indication that a message has been left at the front door intercom/message unit 16 and a beeper 34 for providing an audible indication that a message has been recorded. The beeper 34 is provided so that a visually impaired individual will be able to determine whether a message has been recorded.

The top 12T of the rightmost section 15 of the main control panel 12 has a speaker 44 in communication with the front door intercom/message unit 16 and the various room intercom units 18. The speaker 44 has an associated "listen" button 46 and also a "talk" button 48, both located directly below the speaker 44. The user depresses the "talk" button 48 in order to talk through the intercom system 10 to a visitor at the front door intercom/message unit 16. The user depresses the "listen" button 46 in order to hear the visitor speaking into the front door intercom/message unit 16. The main control panel 12 has twelve security buttons 50 located directly below the talk button 48 and the listen button 46. The security buttons 50 are sequentially numerically labeled and are used for programming a security code into the intercom system 10. After entering the security code into memory, only an individual with knowledge of the security code is able to retrieve the recorded messages or to change the settings entered on the main control panel 12.

The bottom 12B of the control panel 12 has a lowermost section 64 having a number of additional controls. In particular, the left portion of the lowermost section 64 has a volume control knob 52 for controlling the volume at the various room intercom units 18, and a volume control knob 54 for controlling the volume at the main control panel 12. The central portion of the lowermost section 64 has a speed dial button 56. When the user depresses the speed dial button 56, the telephone number for the police is automatically dialed in order to alert the police to an emergency. The central portion of the lowermost section 64 also has a base control adjustment 58 and a treble control adjustment 60, for adjusting the level of base and treble provided by the speaker 44. The right portion of the lowermost section 64 has a master control switchboard 62, having a plurality of switches 63 for selectively powering the main control panel 12, the front door intercom/message unit 16, and one or more of the various room intercom units 18.

The lowermost section 64 is selectively covered by a fold-down access door 20, having an open and a closed position, and having hinges 21 upon which the access door 20 selectively swivels with respect to the lowermost section 64. The access door 20 has a spring-loaded latching device for maintaining the door 20 in the closed position. When the user momentarily depresses the access door 20, the access door 20 springs open, thereby allowing access to the controls selectively hidden beneath the access door 20.

The main control panel 12 is capable of broadcasting music to the front door intercom/message unit 16, and to any of the plurality of room intercom units 18 provided with the system 10. It is contemplated that each of the units 16 and 18 is capable of overriding the music when the units 16 and 18 are used for talking and listening.

Figure 3:
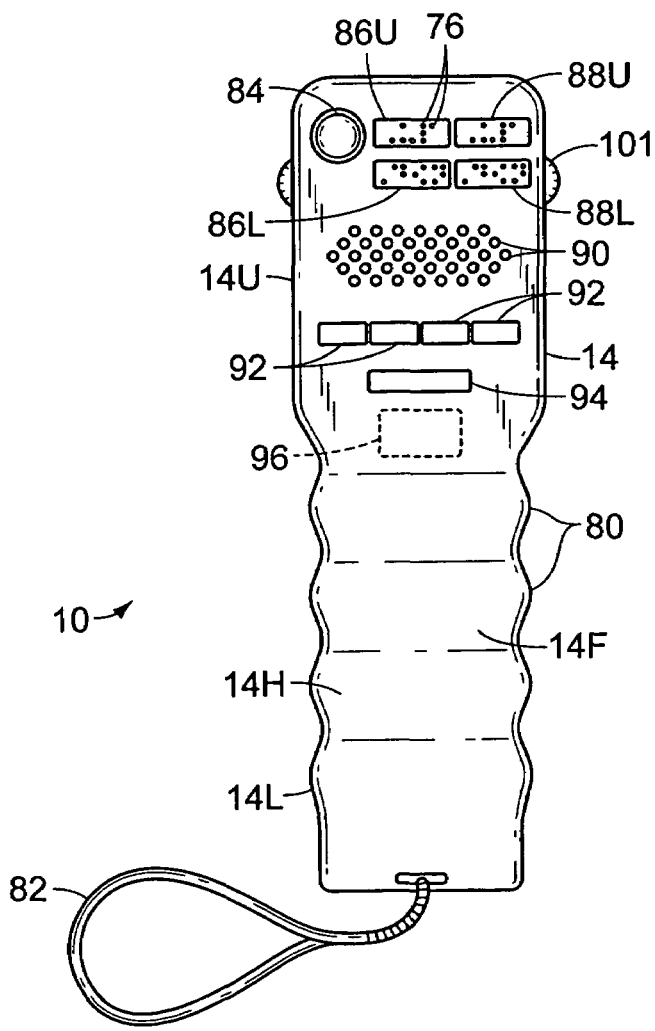
FIG. 3 is a front elevational view of a remote control unit of the intercom system.

FIG. 3 illustrates the remote control unit 14 of the intercom system 10, having a housing 14H having a front surface 14F, a rear surface, an upper portion 14U and a lower portion 14L. The front surface 14F is visible in FIG. 3. The lower portion 14L has a plurality of ribs 80 and a wrist strap 82. The ribs 80 are ergonomic features provided so that the user may firmly grasp the remote control unit 14 in the hand of the user. The wrist strap 82 is selectively worn around the wrist of the user for conveniently transporting the remote control unit 14 between various locations. The remote control unit 14 allows the user to selectively and remotely access all of the functions on the control panel 12. The upper portion 14U of the remote control unit 14 has a power button 84 for selectively powering the unit 14, two tuning controls 86U and 86L, and two volume controls 88U and 88L. The tuning controls 86U and 86L are used for increasing and decreasing, respectively, the frequency of the radio station playing on the clock radio 36. The volume controls 88U and 88L are used for increasing and decreasing, respectively, the volume of sound provided. The remote control unit 14 has a substantially centrally located mode bar 94 for selectively switching between the AM/FM radio mode, the CD player mode, and the message recorder mode. The remote control unit 14 has four function keys 92 located directly above the mode bar 94. The four function keys 92, labeled "stop", "repeat", "play", and "skip", respectively, allow the user to make changes in CD selections which have been entered on the main control panel 12, when the mode bar 94 is on the CD player mode. These same four function keys 92 allow the user to stop, repeat, play, or skip messages, when the mode bar is on the message recorder mode. The remote control unit 14 has two backlight buttons 101 for providing light to the area surrounding the remote control unit 14, in order that the user is able to see the various buttons located on the remote control unit 14. The remote control unit 14 contains a speaker, and has a plurality of circular openings 90 extending fully through the front surface 14F of the housing 14H for allowing the sound which emanates from the speaker to be readily heard by the user. The speaker audibly indicates current mode when the user depresses the mode bar 94, in order that the remote control unit 14 may be used even by visually impaired individuals.

The remote control unit 14 additionally has an emergency button 96 positioned below the mode bar 94. The intercom system is attached to a telephone line and is configured so that when the emergency button 96 is depressed by the user, the control panel 12 immediately dials and connects the intercom system 10 to the phone number of emergency services such as the police department, thereby providing ready access to the police in the event of an emergency. This feature is particularly helpful for elderly and handicapped users.

Figure 4:
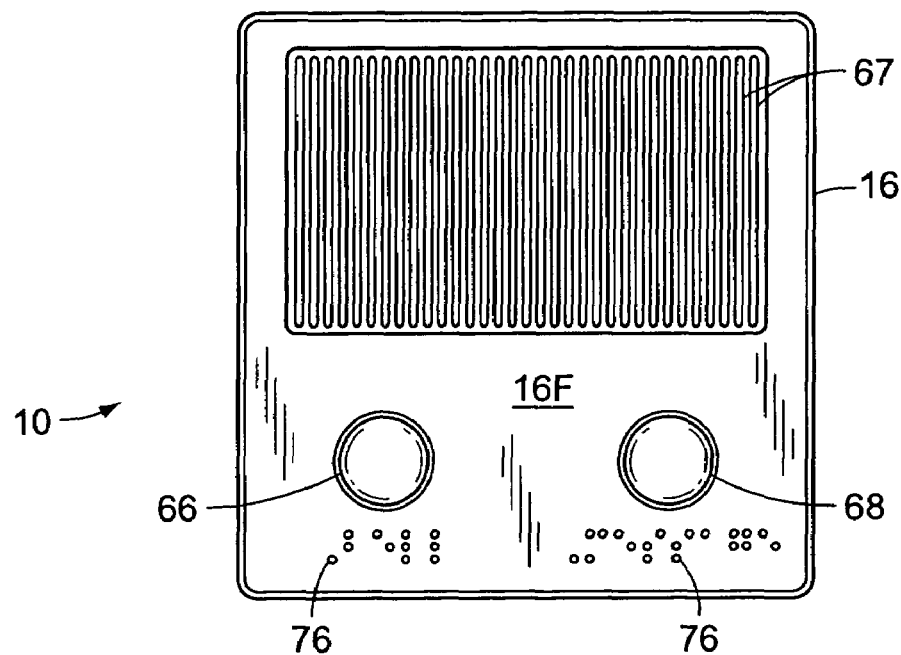
FIG. 4 is a front elevational view of a front door intercom/message unit of the intercom system.

FIG. 4 illustrates the front door intercom/message unit 16 of the intercom system 10, which is accessed by the visitor to the home of the user. The front door intercom/message unit 16 is in electrical communication with the main control panel 12. The front door intercom/message unit 16 contains a speaker therein, and has a front surface 16F having a plurality of longitudinal speaker openings 67 extending fully therethrough. Sound emanating from the speaker is easily transmitted through the speaker openings 67. The unit 16 is equipped with a doorbell button 66 which rings the user's doorbell when depressed. The unit 16 further has a message button 68 for leaving a message when no one is at home. When the visitor depresses the message button 68, this causes the message recorder 38 on the control panel 12 to begin recording the message left by the visitor. After the message has been recorded, the message indicator light 32 on the main control panel 12 is illuminated and the beeper 34 emits a series of beeps, thereby audibly alerting the user that the message has been recorded on the message recorder 38. Stored messages can be retrieved manually from the main control panel 12. Alternately, stored messages may be retrieved from a remote location by use of the remote control unit 14 or by dialing the main control panel 12 from a remote location. Both the doorbell button 66 and the message button 68 have Braille markings 76 located below said buttons 66 and 68, for enabling a visually handicapped visitor to differentiate between the buttons 66 and 68.

Figure 5:
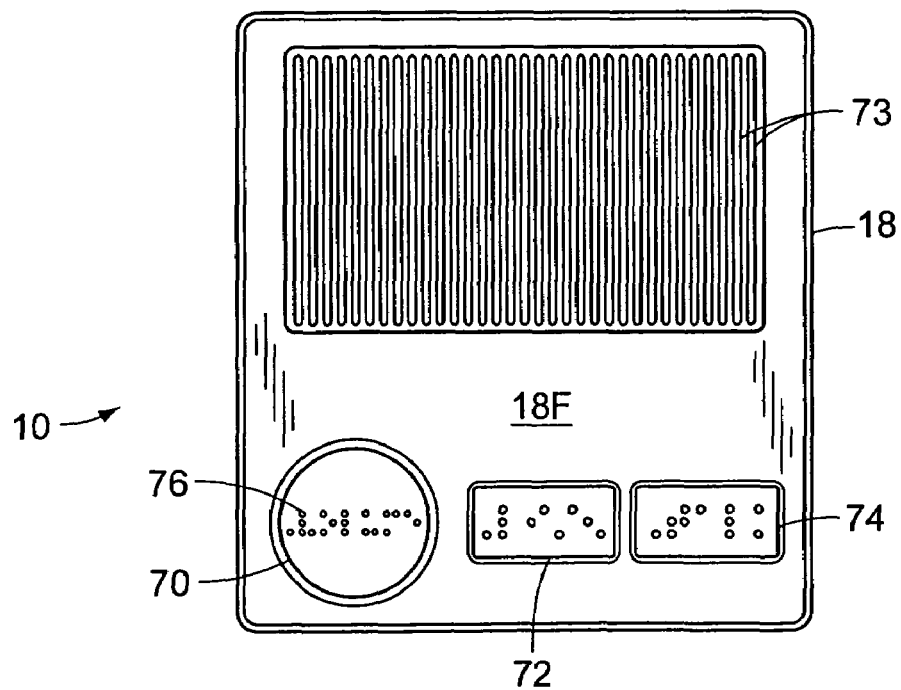
FIG. 5 is a front elevational view of a room intercom unit of the intercom system.

FIG. 5 illustrates the room intercom unit 18 of the intercom system 10. The room intercom unit 18 is in electrical communication with the main control panel 12 and with the front door intercom/message unit 16. The room intercom unit 18 contains a speaker therein, and has a front surface 18F having a plurality of longitudinal speaker openings 73 extending fully therethrough. Sound emanating from the speaker is easily transmitted through the speaker openings 73. The unit 18 is equipped with a volume control knob 70, a "listen" button 72, and a "talk" button 74. The volume control knob 70 allows the user to adjust the volume of sound emanating from the speaker. The "listen" button 72, when depressed, allows the user to listen to the visitor speaking into the front door intercom/message unit 16. The "talk" button 74, when depressed, allows the user to speak to the visitor at the front door intercom/message unit 16. Each of the room intercom units 18 is additionally capable of broadcasting music from the clock radio 36 or CD player 30 of the main control panel 12.

When the intercom system 10 is used in conjunction with an apartment building having a plurality of individual apartments, the main control panel 12 is mounted on a wall in the apartment of the user which is close to the front door of the apartment. The front door intercom/message unit 16 is positioned in proximity to the main front door of the apartment building. The room intercom units 18 are positioned in various rooms of the user. The remote control unit 14 may be carried between various locations within the apartment. Each of the components of the intercom system 10 is in communication with one another, so that the components are able to transmit and receive sound from one another. The user enters a security code into the intercom system 10 by depressing the security code buttons 50. After doing so, only someone with knowledge of the security code is capable of changing the settings on the intercom system 10 or retrieving messages left at the front door intercom/message unit 16. The user now sets the clock radio 36, and may selectively listen to the radio of the clock radio, the CD player 30, or the messages which have been left upon the message recorder 38, by toggling between these modes by pressing down upon the mode bar 94 or by pressing down upon the appropriate buttons on the main control panel 12. The message indicator light 32 provides a visual indication that a message has been left, and the beeper 34 provides an audible indication that a message has been left. The various buttons on the main control panel 12 and on the different units 14, 16, and 18, are labeled with Braille markings so that the system 10 is readily accessible by visually impaired individuals.

In conclusion, herein is presented a multifunctional intercom system. The invention is illustrated by example in the drawing figures, and throughout the written description. It should be understood that numerous variations are possible, while adhering to the inventive concept. Such variations are contemplated as being a part of the present invention.

What is claimed is:

1. A multifunctional intercom system, for use by a resident of an apartment building and a visitor to that apartment building, said apartment building having a main front door and a plurality of individual apartments each having a front door having a doorbell, comprising:

a main control panel, mountable near the front door of one of the individual apartments, having a message recorder for recording incoming messages left by the visitor, at least one message recorder button for playing the messages left upon the message recorder, a message recorder light which is selectively illuminated, a speaker having an associated listen button and a talk button, for listening and talking by the user, respectively, to the visitor at the main front door, said main control panel also having a CD player having a plurality of CD compartments for selectively holding compact discs, wherein said CD player is in communication with and is capable of playing each of the CDs within the CD compartments, said main control panel further having a clock radio having a radio and an alarm clock;

a front door intercom/message unit, in electrical communication with the main control panel, mountable near the main front door of the apartment building, accessed by the visitor visiting the apartment of the resident, said front door intercom/message unit having a speaker, a doorbell button for ringing the resident's doorbell, a message button for leaving a message when the resident is not in the apartment, wherein when the visitor depresses the message button, the message recorder on the control panel records the message, and wherein after the message has been recorded, the message indicator light on the main control panel is illuminated, thereby alerting the resident that the message has been recorded on the message recorder, wherein said front door intercom/message unit is capable of selectively broadcasting music from the CD player or radio on the main control panel; and a remote control unit in communication with the main control panel for allowing the user to selectively access all of the functions on the main control panel from a remote location, said remote control unit having a speaker, a power button for selectively powering the remote control unit, tuning controls for varying the frequency of the radio station playing on the clock radio, buttons for selectively retrieving and playing messages left on the message recorder, buttons for playing the CD player, and volume controls for adjusting the volume of sound provided.

2. The intercom system as recited in claim 1, further comprising at least one room intercom unit, in electrical communication with the main control panel, the front door intercom/message unit, and the remote control unit, said room intercom unit having a speaker, a listen button for allowing the resident to listen to the visitor speaking into the front door intercom/message unit, and a talk button for allowing the resident to speak to the visitor at the front door intercom/message unit, wherein said at least one room intercom unit is capable of transmitting and receiving messages left at the front door intercom/message unit and is additionally capable of broadcasting music received from the clock radio or CD player of the main control panel.

3. The intercom system as recited in claim 2, wherein the message recorder has a plurality of associated message recorder buttons for controlling message volume level, rewinding, fast-forwarding, and playing the messages.

4. The intercom system as recited in claim 3, wherein the buttons on the main control panel, the front door intercom/message unit, the at least one room intercom unit, and the remote control unit are labeled with Braille markings, so that a visually impaired user can differentiate between the various buttons, and wherein the main control panel has a beeper for providing an audible indication that a message has been recorded so that a visually impaired user will be able to determine when a message has been recorded.

5. The intercom system as recited in claim 4, wherein the remote control unit has a mode bar for selectively switching between the radio mode, the CD player mode, and the message recorder mode.

6. The intercom system as recited in claim 5, wherein the remote control unit has a plurality of function keys for allowing the resident to make changes in music selections which have been entered on the main control panel when the mode bar is on the CD player mode, for allowing the resident to navigate the frequencies of the radio when the mode bar is on the radio mode, and for allowing the resident to stop, repeat, play, or skip messages when the mode bar is on the message recorder mode.

7. The intercom system as recited in claim 6, wherein the speaker within the remote control unit audibly indicates the current mode when the user depresses the mode bar, in order that the remote control unit may be used by visually impaired individuals.

8. The intercom system as recited in claim 7, wherein the message recorder is connected to a phone line so that the user can call the message recorder from an outside line, in order to retrieve the messages which have been recorded thereon, and to allow the intercom to contact emergency services when prompted by the user.

9. The intercom system as recited in claim 8, wherein the main control panel has a plurality of security buttons for programming a security code into the intercom system, wherein after entering the security code into memory, only an individual with knowledge of the security code is able to retrieve the recorded messages or to change the settings entered on the main control panel.

10. The intercom system as recited in claim 9, wherein the main control panel has a master control switchboard having a plurality of switches for selectively powering the main control panel, the front door intercom/message unit, and the at least one room intercom unit.

11. The intercom system as recited in claim 10, wherein the stored messages may be retrieved from a remote location by use of the remote control unit.

12. The intercom system as recited in claim 11, wherein the CD player has a song selector bar which, when selectively activated, randomly chooses a series of songs from the CD compartments for play.

13. The intercom system as recited in claim 12, wherein the main control panel has a speed dial button, and wherein the remote control unit has an emergency button, wherein when either of said buttons are depressed, the intercom system automatically dials the telephone number of the police in order to alert the police to an emergency.

14. The intercom system as recited in claim 13, wherein the remote control unit has a plurality of ribs in order that the user may firmly grasp the remote control unit in the hand of the user, and a wrist strap for conveniently transporting the remote control unit between various locations.

15. The intercom system as recited in claim 14, wherein the message recorder has an associated message screen, for displaying the messages recorded upon the message recorder, in order that a hearing impaired individual may read the messages.

16. A method of using a multifunctional room intercom system, by a resident of a residence and a visitor to the residence, said residence having a front door and a doorbell, the residence having at least one room other than the one in which the main control panel is located, said intercom system having buttons labeled with Braille markings as well as with printed characters, having a main control panel having security code buttons, a clock radio, a CD player, a message recorder, a plurality of message recorder buttons, a message indicator light, and a beeper, said intercom system further having a front door intercom/message unit having a message button and a doorbell button, said intercom system also having at least one room intercom unit, said intercom system also having a remote control unit having a mode bar, said method comprising the steps of:

a) mounting the main control panel on a wall in the apartment of the resident which is close to the front door of the apartment;

b) mounting the front door intercom/message unit in proximity to the main front door of the apartment building;

c) mounting the at least one room intercom unit in the at least one room other than the room in which the main control panel is located;

d) electrically connecting the main control panel, the front door intercom/message unit, and the at least one room intercom unit to one another, so that they are able to communicate with each other;

e) carrying the remote control unit by the resident between the rooms of the apartment;

f) entering a security code by the resident into the intercom system by depressing the security code buttons, and preventing access to message retrieval without said security code;

g) setting the clock radio;

h) illuminating the message indicator light and sounding the beeper on the main control panel after allowing the visitor to leave a message at the front door intercom/message unit and storing the message in the message recorder;

i) listening to the radio and the CD player, by toggling between these modes by selectively performing one of pressing down upon the mode bar located on the remote control unit, and pressing buttons on main control panel; and j) retrieving the messages left at the front door intercom/message unit by pressing down on the appropriate message recorder button for message retrieval.

17. The method of using a multifunctional intercom system as recited in claim 16, wherein the step of retrieving the messages left at the front door further comprises:

(a) reading the Braille markings on the various buttons on the main control panel to determine the appropriate button for message retrieval and on the different units by a visually impaired individual; and (b) displaying a text version of the message upon the display by recognizing speech patterns within the message by the computer.

* * * * *